Dec. 15, 1959  R. H. KAMPFER  2,917,155
CONVEYOR FEED CONTROL
Filed Aug. 8, 1956
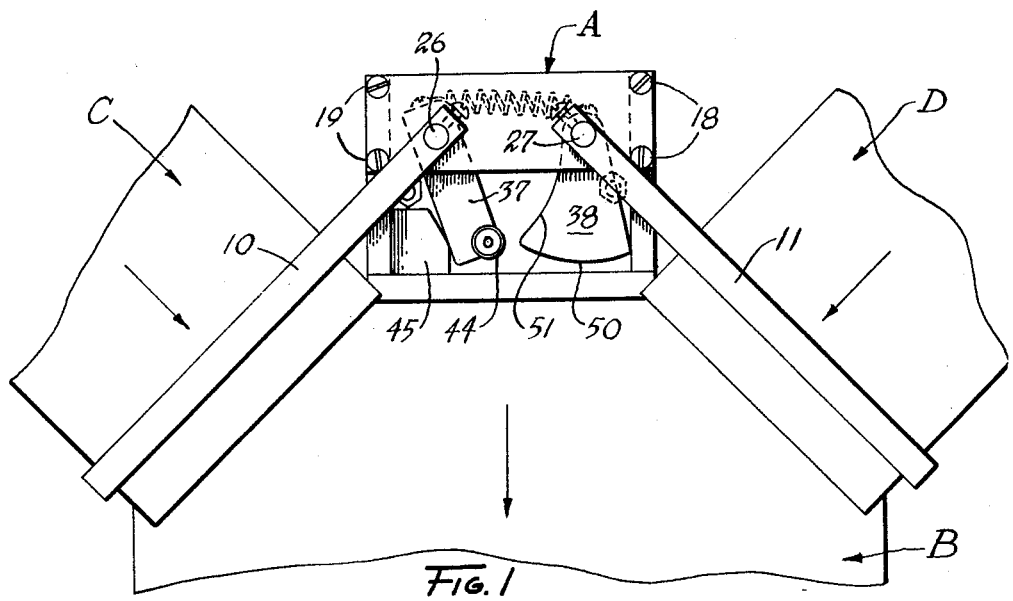
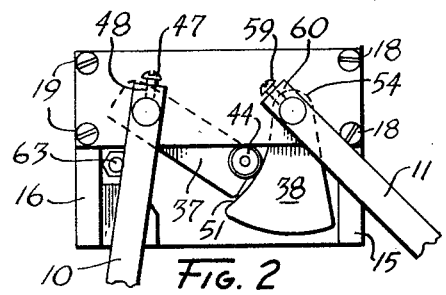
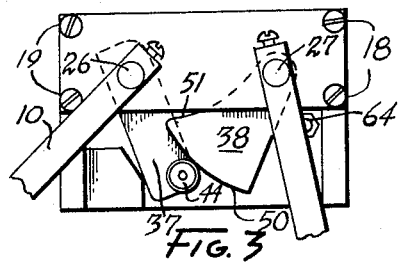
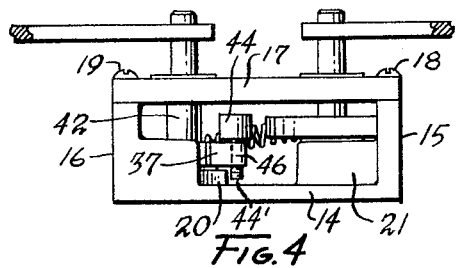
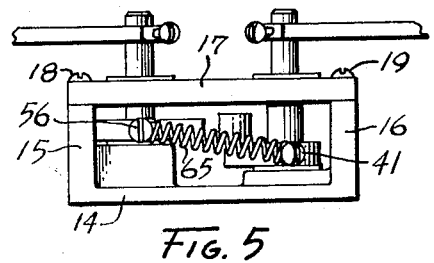
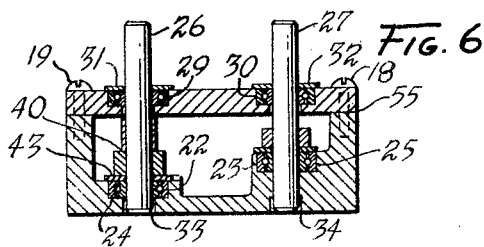
INVENTOR
Richard H. Kampfer
BY
ATTORNEY

United States Patent Office 2,917,155
Patented Dec. 15, 1959

2,917,155

CONVEYOR FEED CONTROL

Richard H. Kampfer, St. Paul, Minn.

Application August 8, 1956, Serial No. 602,827

3 Claims. (Cl. 198—21)

This invention relates to an improved conveyor feed transfer device, arrangement and method. More particularly, the improvement is in a method of conveyor feed from a double belt to a single belt by a device adapted to control movement of light articles through the provision of alternately operable blocking arms cooperatively engageable in a pivotal interlocking and interengaging relationship for blocking simultaneous movement of goods from either one or the other of a pair of belt conveyors to a single conveyor. The device and method providing continuous movement of goods from one of the double conveyors to the single conveyor so long as there is a continuous flow thereon against a displaced blocking arm which, in its pivotal relationship, prevents another blocking arm from moving out of the path of goods abutting thereagainst on the other of the double conveyors.

Numerous and different types of conveyor transfer devices are well known which operate by electric eyes, the weight of the goods and gravity arrangements to alternately transfer goods from one conveyor to another. However, there is need for a conveyor transfer with a double arm interlocking arrangement in cooperable interengaging relationship which keeps one blocking arm from moving out of the path of its respective conveyor belt so long as the weight of objects displace the other arm and vice versa.

Accordingly, it is an object of this improvement to provide a device for controlling the transfer of articles from double conveyor belts to single conveyor belts by a cooperable pair of self engageable alternately and sequentially pivotal locking bars relatively connected to a pair of arms extending across a pair of conveyor feeds. One of the arms is adapted to be pushed to one side by the weight of an object on a conveyor while holding cooperable locking bars in interengaging relationship to prevent the displacement of the other of the arms and vice versa.

It is another object of this improvement to provide a conveyor feed control having interengaging and interlocking cam surfaces connected in pivotal relationship with a pair of arms adapted to extend across a pair of feed conveyors leading to a single conveyor, to control a continuous flow from one or the other of a pair of feed conveyors to the single conveyor.

An additional object of this improvement in a conveyor feed control is to provide a pair of angularly extending arms mounted upon pivots having a relative cam bar and interengaging roller extending in different angular relationship than the arms extending from said pivots and serving as stops permitting pivotal displacement of only one of the angularly extending arms at a time.

Further objects and advantages will be apparent from the following description of the accompanying drawings wherein:

Figure 1 is a top plan view illustrating the conveyor feed control in mounted relationship across a pair of conveyors feeding into a single conveyor.

Figure 2 is a partial top plan view of the structure shown in Figure 1 illustrating the interlocking feature of the feed control operative with one of the pairs of conveyors feeding into the single conveyor and blocking the other conveyor.

Figure 3 is a partial top plan view of the structure of Figure 1 illustrating the interlocking feature of the feed control and alternate position to that shown in Figure 2.

Figure 4 is a front plan view of the feed control shown in Figure 1 having the arms in partial view.

Figure 5 is a back plan view of the structure shown in Figure 4.

Figure 6 is a partial cross sectional view through the conveyor feed control frame illustrating the pivotal mountings which support the interengaging and interlocking cam and roller surfaces and the conveyor blocking arms shown in Figures 1 through 5.

In the following description like parts will be similarly indicated.

With reference to Figure 1, the conveyor feed control A is positioned substantially centrally of a single conveyor belt B. The single conveyor belt B is alternately fed from one side by one conveyor C, under the control of blocking arm 10, and from the other side by the conveyor D, under the control of blocking arm 11. As will be understood from the following description, light objects, as milk bottles, packaged goods and the like, when flowing or passing from one of the pairs of conveyors C or D to the single conveyor B automatically and mechanically keeps such material from flowing or passing from the other of the conveyors D or C to conveyor B. That is, the arm 10 when pushed to one side by articles passing on conveyor C to conveyor B provides its own blocking operation to prevent the movement of arm 11 from its relative blocking action over conveyor D and vice versa. That is, arm 11 when freeing the passage of articles from conveyor D to conveyor B provides a reciprocal blocking action to stop arm 10 from moving out of the path of articles on conveyor C.

The conveyor feed control is provided as a rectangular frame having a base 14 provided with integral sides 15 and 16 and a partial top 17 removably secured to the sides 15 and 16 by pairs of screws 18 and 19, respectively.

The base 14 is provided with a spaced pair of integral studs 20 and 21 having apertures 22 and 23 therein, within which are mounted sets of roller bearing mountings 24 and 25. The roller bearing mountings 24 and 25 aid in pivotally supporting shafts 26 and 27, respectively, in the manner as hereinafter described. The partial top 17 is also provided with apertured recesses 29 and 30 within which are bearing mountings 31 and 32, respectively, in alignment with the roller bearing mountings 24 and 25, respectively. Spaced apertures 33 and 34 are provided in base 14 to permit the lower ends of the pins 26 and 27, respectively, to be mounted therein and slide in and out of the frame either from the base 14 or the partial top 17. The bearing mountings 24 and 31 pivotally support pin 26 in a vertical position in aperture 33, in spaced parallel relationship to the pin 27 pivotally supported in aperture 34 by bearing mountings 25 and 32.

To control the relative movement of the arms 10 and 11 and secure the pins from vertical displacement, there is provided a pair of pivotally interengageable cooperable locking bars 37 and 38 secured on pins 26 and 27, at angles relatively adjustable to the arms 10 and 11, respectively. The bar 37 is a relatively rectangularly shaped elongated extension having an aperture 40 at one end through which pin 26 slides in making the assembly. A set screw 41, turned into a suitable threaded aperture (not shown) at an angle perpendicular to aperture 40, bears against pin 26 to cause the bar 37 to pivot with the pin 26 and arm 10, or lock the arm 10 from pivotal movement, in the manner as hereinafter described. The set screw 41 on bar 37, with the aid of a bushing 42 also keeps the pin 26 from sliding from its mounted position. The end 43 of bearing mounting 24 serves as a lower support for the bar 37.

A roller bearing 44, mounted by screw 44' set in a suitable threaded aperture 46 in bar 37 is positioned to pivot over an outer corner edge of bar 37. A raised stud 45 extending upwardly from the base 14 serves as a back stop against which bar 37 abuts when arm 10 is in blocking relationship over conveyor C. The angular setting of arm 37 on pin 26 is accomplished by turning the end of set screw 41, in a suitable threaded aperture (not shown) to bear against the pin 26, as indicated. As illustrated in Figure 1, this setting normally positions the arm 10 in a preset perpendicular relationship relative to conveyor C and, when not blocked, swings through an arc with the arm 10 for a sufficient distance to clear the arm 10 from its blocking position over conveyor C.

The arm 10 is provided with an end aperture therethrough by which the end of arm 10 slides over pin 26 and a set screw 47, turned into a threaded aperture 48, fastens the arm to the pin 26 over the conveyor C and in pivotal relationship with arm 37, as described.

The bar or cam 38 is a relatively wedge-shaped piece having a convex end curvature 50 and a concave side curvature 51. The base end 54 of bar 38 is provided with a suitable aperture 55 through which pin 27 slides when mounting the pin 27 in the bearing housings 32 and 25, as described. A set screw 56 turns into a threaded aperture (not shown) to bear against pin 27 and lock the bar 38 on pivot pin 27 in an angular relationship to arm 11. The arm 11 is provided with an aperture therethrough by which it is mounted on pin 27 and a set screw 59, threaded in aperture 60 and bearing against pin 27, holds the arm 11 normally positioned across conveyor D. The wall 15 serves as an abutment against which bar 38 normally rests when arm 11 blocks conveyor D.

At the converging point between conveyors C and D, the conveyor feed control A is mounted upon a support (not shown) and the frame is fastened down by a pair of bolts and nuts 63 and 64. In this secured position and relationship, arm 10 is normally positioned to extend across and relatively block conveyor C and arm 11 is normally positioned to extend across and relatively block conveyor D. A tension spring 65 has its relative opposite ends secured about the threaded stem portions of screws 41 and 56. The pulling tension of spring 65 normally pulls or rotates the pins 26 and 27 to hold bar 37 against back stop 45 and bar 38 against the inner surface of wall 15 which serves as a back stop therefor.

As shown in Figure 1, the angular relationship of bar 37 to arm 10 and bar 38 to arm 11 is to allow one or the other of the bars to first pivot freely without interference from, or with, the other. However, for example, when articles are pushing arm 10 aside to pass from conveyor C to conveyor B, the bar 37 rotates with arm 10 to bring the peripheral face of roller 44 against the concave side of bar 38 to block movement of the bar 38 and its corresponding arm 11. Thus the arm 11 is maintained in blocking relationship to conveyor D until conveyor C is cleared or arm 10 is no longer positioned to clear conveyor C.

On the other hand, when articles on conveyor D first push and pivot arm 11 out of the way, bar 38 is also pivoted to move the convex side 50 over into the pivotal path of roller 44 and block movement of arm 37, which in turn maintains arm 10 is blocking relationship over conveyor C.

In accordance with the patent statutes, I have described the principles of construction and operation of my Conveyor Feed Control, and while I have endeavored to set forth the best embodiment thereof, I desire to have it understood that obvious changes may be made within the scope of the following claims without departing from the spirit of my invention.

I claim:

1. A conveyor control for controlling the flow of articles from a pair of converging conveyors into a single conveyor including a frame supported between the conveyors of said pair, a pair of parallel pivots mounted on said frame, an arm mounted on each pivot to normally extend over a corresponding conveyor of said pair, a second arm on one of said pivots for movement therewith, a roller on said second arm movable in an arcuate path about the axis of said one pivot, a cam mounted on the other pivot for rotation therewith, said cam including a concave surface having its center of arcuation substantially at the axis of said first pivot in normal position of said arms and against which said roller may engage upon pivotal movement of said one pivot, and said cam including a convex surface having its center of arcuation substantially at the axis of said other pivot and against which said roller may engage upon rotation of said other pivot, whereby said roller comprises the sole means to selectively hold either pivot from rotation upon pivotal movement of the other pivot and hold either arm over its corresponding conveyor upon pivotal movement of the other arm.

2. The structure of claim 1 and including resilient means normally urging said roller and cam toward non-engaging position.

3. The structure of claim 2 and including stop means on said frame limiting pivotal movement of said second arm and said cam in non-engaging position.

References Cited in the file of this patent

UNITED STATES PATENTS

| | | |
|---|---|---|
| 2,130,330 | Sibley | Sept. 13, 1938 |
| 2,265,719 | Cargill | Dec. 19, 1941 |
| 2,349,968 | Kampfer | May 30, 1944 |
| 2,682,329 | Bissett | June 29, 1954 |
| 2,690,250 | Coleman | Sept. 28, 1954 |